April 30, 1940. S. WITCZAK 2,199,034
FISHING ROD HOLDER
Filed March 28, 1939
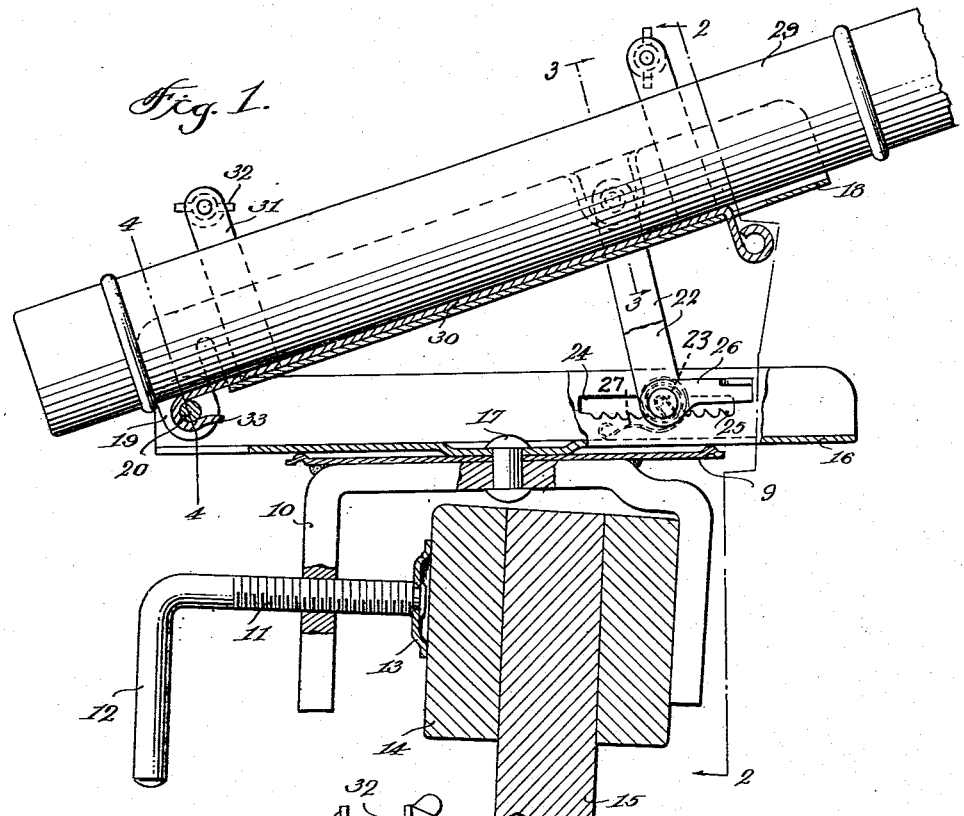
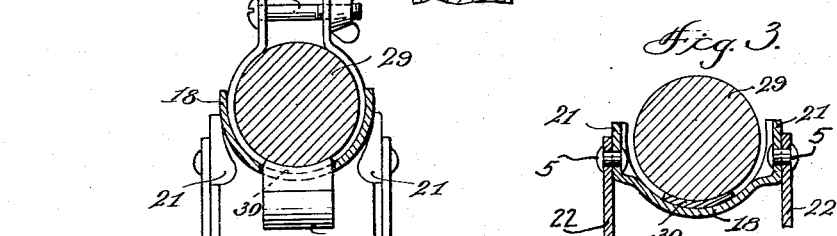
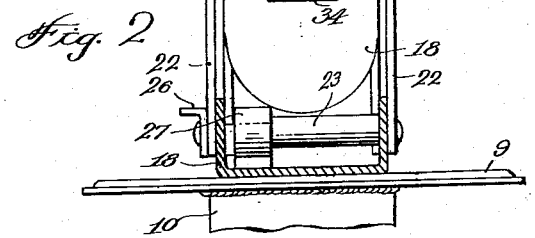
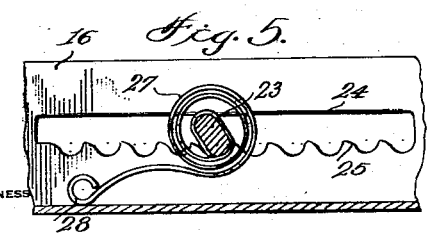
Sylvester Witczak, INVENTOR
BY Victor J. Evans & Co.
ATTORNEYS Patented Apr. 30, 1940

2,199,034

UNITED STATES PATENT OFFICE 2,199,034

FISHING ROD HOLDER

Sylvester Witczak, Detroit, Mich.

Application March 28, 1939, Serial No. 264,616

2 Claims. (Cl. 248—42)

This invention relates to fishing rod holders and has for an object to provide a device of this character adapted for boat use and adapted to support a fishing rod at various desired angular positions.

A further object is to provide a device of this character having a mounting bracket and quickly adjustable means thereon for securing the fishing rod to extend at various elevations.

A further object is to provide a device of this character to which a fishing rod may be quickly applied and removed without the use of tools and when applied will be securely held against accidental dislodgement.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a fishing rod holder constructed in accordance with the invention, in applied position.

Figure 2 is a cross sectional view taken on the line 2—2 of Figure 1 showing the means for adjusting the elevation of the fishing rod.

Figure 3 is a cross sectional view taken on the line 3—3 of Figure 1 showing the pivotal connections for adjusting means with the channeled fishing rod supporting member.

Figure 4 is a cross sectional view taken on the line 4—4 of Figure 1 showing the rear pivotal connection of the supporting member with the securing bracket of the fishing rod holder.

Figure 5 is a detail longitudinal sectional view showing the adjusting bolt and one of the slots in the bracket through which the bolt passes.

Referring now to the drawing in which like characters of reference designate similar parts in the various views, 10 designates a substantially U-shaped clamp having a clamp bolt 11 threadedly engaged through one of the legs. The clamp bolt is provided with an angularly directed handle 12 at one end and with a swivelly mounted washer at the opposite end which coacts with the other leg of the bracket in clamping the bracket to the rail 14 of a fishing boat 15.

A channel bracket 16 is pivotally mounted on the clamp through the medium of a vertically disposed pivot pin 17 which is passed through the bottom web of the bracket and through the clamp 10 between the legs of the latter. The pivot pin forms a vertical axis of rotation for the bracket. A beaded disc 9 is fixed to the top of the clamp and prevents rocking of bracket 16 and takes some of the strain off the pivot 17.

A substantially semi-cylindrical fishing rod supporting member 18 is connected at one end to the bracket and for this purpose the member is provided with hinge ears 19 through which, and the flanges of the bracket, a pivot pin 20 is passed.

The opposite end of the supporting member is deformed as shown at 21 in Figure 3 to provide hinge ears. A pair of links 22 are pivotally secured at the upper ends to the hinge ears through the medium of pivot pins 5. These links extend downwardly to the bracket to swing the supporting member on a horizontal axis of rotation about the pivot pin 20.

The links 22 are adjustably secured to the bracket and for this purpose the lower ends of the links are connected to an adjusting bolt 23 which is engaged at the ends through longitudinal slots 24 formed in the flanges of the channel bracket 16. The bottom edges of the slots are provided with teeth 25. The bolt is elongated transversely in cross section as best shown in Figure 5 so that it may be turned to slide along the slots 24 or may be turned to engage back of a pair of the teeth in the slots and for this purpose the bolt is equipped with an angular handle 26 best shown in Figure 2.

A coil spring 27 is secured at one end of the bolt and is sleeved upon the bolt, as best shown in Figures 2 and 5. The free end 28 of the spring bears against the bottom web of the channel bracket 16. The spring releasably holds the adjusting bolt in any set position.

In further carrying out the invention the fishing rod 29, which may be of any conventional construction, is equipped with a latch member 30 in the nature of an elongated bar which is secured to the rod through the medium of split ring clamps 31 which are equipped with clamp bolts 32 to draw the clamps securely around the rod. The latch member is provided at one end with a hook 33 which is sleeved upon the pivot pin 20 at one end of the fishing rod supporting member 18. The opposite end of the latch member is provided with a spring loop 34 which is engaged through an opening 35 in the bottom web of the supporting member 18. The latch member provides means by which the fishing rod may be easily and quickly applied or removed from the supporting member 18.

From the above description it is thought that the construction and operation of the invention will be fully understood without further explanation.

What is claimed is:

1. A fishing rod holder comprising a clamp adapted to be secured to the side of a boat, a bracket mounted upon the clamp for rotation about a vertical axis, a substantially semicylindrical fishing rod supporting member connected at one end to one end of the bracket for swinging movement about a horizontal axis, a link pivotally connected at the upper end to the other end of the supporting member, there being a longitudinal slot in said bracket, a bolt connected to the lower end of the link and engaged through said slot, and means for setting the bolt at various adjusted positions longitudinally of the slot for securing said supporting member at any desired angular position with relation to the bracket.

2. A fishing rod holder comprising a clamp adapted to be secured to the side of a boat, a channel bracket, mounted upon the clamp for rotation about a vertical axis, a substantially cylindrical fishing rod supporting member having hinge ears at one end, a pivot pin passed through the flanges of the channel bracket and through said hinge ears, a pair of links pivotally secured at the upper ends to the other end of the supporting member and extending downwardly along the flanges of the bracket, there being longitudinal slots in the bracket provided with teeth, a bolt of elongated cross section in one direction engaged through said slots and connected to the lower ends of said links, said bolt adapted to be turned in one direction to slide longitudinally of the slots and to be turned in the opposite direction to lodge behind the teeth of the slots for adjusting the angular elevation of the supporting member relatively to the bracket, and means for securing the fishing rod to said supporting member.

SYLVESTER WITCZAK.